United States Patent [19]

Linko, III et al.

[11] 4,155,681

[45] May 22, 1979

[54] MANIFOLD PROTECTION SYSTEM

[75] Inventors: Peter J. Linko, III; Michael A. Radomski; William E. Schoenborn, all of Cincinnati, Ohio

[73] Assignee: General Electric Company, Cincinnati, Ohio

[21] Appl. No.: 768,588

[22] Filed: Feb. 14, 1977

[51] Int. Cl.² ............................................. F01B 25/00
[52] U.S. Cl. .................................... 415/144; 415/168; 60/39.09 R
[58] Field of Search .................. 415/121 G, 144, 145, 415/168, 199.5, 27, 28, 29; 60/39.07, 39.09 R

[56] References Cited

U.S. PATENT DOCUMENTS

| 2,698,711 | 1/1955 | Newcomb | 415/145 |
| 2,720,356 | 10/1955 | Erwin | 415/144 |
| 3,108,767 | 10/1963 | Eltis et al. | 60/39.07 X |
| 3,632,223 | 1/1972 | Hampton | 415/199.5 X |

FOREIGN PATENT DOCUMENTS 987625  3/1965  United Kingdom ................... 60/39.07

Primary Examiner—C. J. Husar
Assistant Examiner—Donald S. Holland
Attorney, Agent, or Firm—Henry J. Policinski; Robert C. Lampe, Jr.; Derek P. Lawrence

[57] ABSTRACT

A protection system for use with a bleed manifold of a gas turbine engine is provided and is comprised of barrier means disposed within the manifold for preventing at least a portion of incendiary particles entrained in a fluid flowing instream through the manifold from impinging upon a wall associated with said manifold. Shielding means are also provided for shielding engine casing bleed ports from impingement by the particles.

9 Claims, 4 Drawing Figures

MANIFOLD PROTECTION SYSTEM

BACKGROUND OF THE INVENTION

This invention relates to a manifold protection apparatus and, more particularly, to apparatus for protecting a manifold associated with a gas turbine engine from the deleterious effects of particles entrained in the gas flow stream of the gas turbine engine.

Gas turbine engines of modern vintage utilize lightweight materials, such as titanium, as structural members in the construction of various components of the fan and compressor section of the engine. For instance, compressor rotors, rotor and stator airfoils, compressor casings and frames have all been constructed of titanium materials. These components have generally exhibited excellent performance and life characteristics during prolonged operation in the severe environment encountered in a gas turbine engine.

On extremely rare occasions, during the course of engine operation, abnormal conditions, such as fan blade, turbine blade or bearing failure may cause high unbalance of the rotating components of the engine. In such instances, rotating compressor blades may rub against their respective stationary casings whereupon friction-generated heat and high internal pressure of the engine may cause titanium particles to ignite and burn. Molten, burning titanium particles may enter the high velocity gas flow stream for passage downstream.

Associated with the compressor section of a gas turbine engine, bleed manifolds are disposed at selected locations along the axial length of the compressor for the purpose of drawing off pressurized air required for turbine cooling and for various mechanical systems on board the aircraft. The manifolds are generally constructed of relatively thin and unprotected walls which are particularly susceptible to the deleterious effects of the aforementioned molten burning titanium particles. More particularly, high velocity pressurized air, in which the titanium particles are entrained, passes through bleed apertures in the compressor casing into the manifold where the molten, burning particles impinge upon the aforementioned thin manifold walls. While the burn life of the titanium particles is limited to a short period of time, a few seconds in most instances, the intense momentary local incendiary action of the titanium particles may cause damage to the thin manifold walls. The present invention is directed toward protecting the manifold walls from the deleterious effects of the incendiary titanium particles.

Therefore, it is an object of the present invention to provide apparatus for protecting a manifold associated with a gas turbine engine from the deleterious effects of particles entrained in the gas stream of the gas turbine engine.

SUMMARY OF THE INVENTION

These and other objects, which will become apparent from the following specification and appended drawings, are accomplished by the present invention, which, briefly stated, provides a protection system for use in a bleed manifold associated with a gas turbine engine wherein the manifold has a wall partially defining a flow path for a fluid periodically carrying incendiary particles entrained therein. The system is comprised of barrier means disposed within the manifold and within the fluid flow stream upstream of the wall for preventing impingement of at least a portion of the particles upon the wall. The barrier means may include means for removing the portion of particles from the flow stream which may be comprised of means for turning the fluid stream. The barrier means may further include pocket means adjacent the fluid flow stream for receiving the particles removed from the fluid flow stream. The stream turning means may be comprised of inlet and outlet means for providing an abrupt change in direction of fluid flowing within the barrier means whereby the inertia of the portion of particles carries the portion of particles out of the flow stream and into the pocket means. The barrier means may also include a shielding grommet disposed within an engine casing bleed port between the fluid flow stream and a wall defining the bleed port. The barrier means may be comprised of a double-walled portion having spaced apart inner and outer walls with a heat resistant barrier material disposed in the space between the inner and outer walls.

DESCRIPTION OF THE DRAWINGS

While the specification concludes with claims particularly pointing out and claiming the invention described herein, it is believed that the invention will be more readily understood by reference to the discussion below and the accompanying drawings in which:

DESCRIPTION OF THE PREFERRED EMBODIMENT

Figure 1:
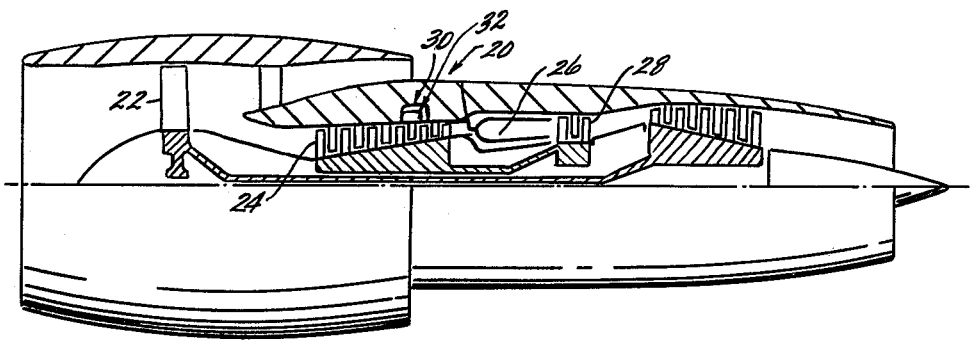
FIG. 1 is a schematic representation of an aircraft gas turbine engine including the engine manifold.

Referring to FIG. 1, a schematic view is depicted of a gas turbine engine, shown generally at 20, to which the present invention is applicable. Engine 20 is comprised generally of fan section 22, compressor section 24, combustor section 26 and turbine section 28 arranged in a serial flow relationship. The operation of the gas turbine engine shown in FIG. 1 is well known to those skilled in the art and hence a description of engine operation is not deemed to be necessary.

Bleed manifold 30 circumscribes, and is in fluid communication with, the high pressure aft portion of compressor section 24, through bleed port 31, for the purpose of drawing off high pressure air for delivery to mechanical systems associated with aircraft. Manifold 30 includes an inner wall 33 which defines a flow path for fluid flowing in a stream through the manifold. Bleed manifold 30 extends circumferentially around compressor 24 and may be divided into two circumferential segments each having an arc of approximately 170°. Barrier means 32 is disposed within bleed manifold 30 for the purpose of protecting manifold 30 from the deleterious effects of particles entrained in the high pressure air stream entering manifold 30.

For purposes of the invention to be described herein, the term "axial direction" shall mean the direction parallel to the horizontal centerline or axis of gas turbine engine 20 as viewed in FIG. 1. The term "radial direction" shall mean a direction along a line which is perpendicular to and which intersects the same horizontal centerline. The term "circumferential direction" shall mean a direction along a line generally formed by a locus of points in the same axial plane and equidistant from the same horizontal centerline.

Figure 2:
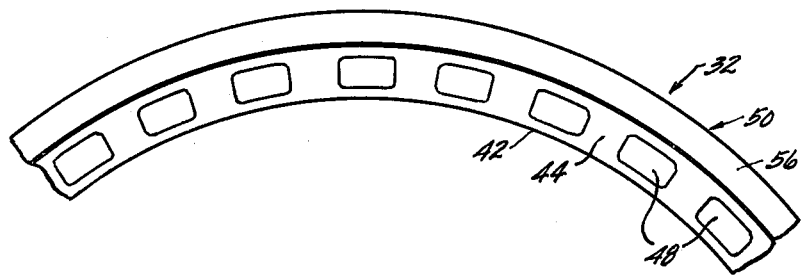
FIG. 2 is a frontal view of a segment of the barrier means comprising the present invention.
Figure 3:
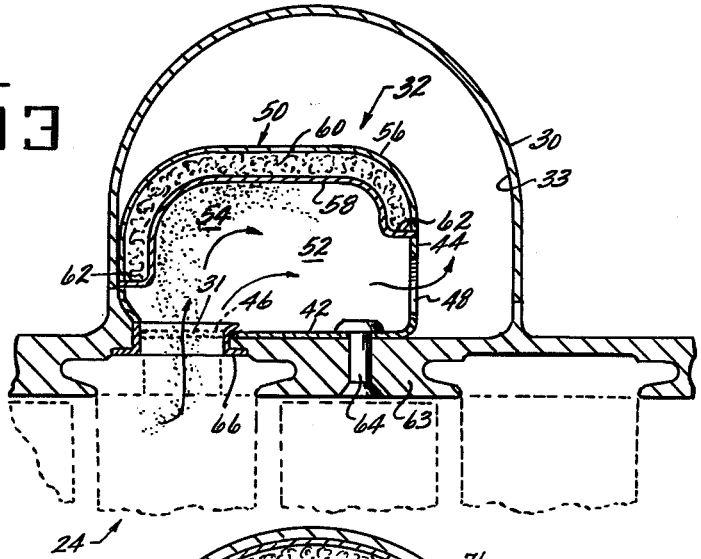
FIG. 3 is a cross-sectional view of the barrier means depicted in FIG. 2 disposed within the engine bleed manifold associated with an engine compressor casing.

Attention is now directed to FIG. 2 which depicts a frontal view of a single segment of barrier means 32 and to FIG. 3 which depicts a cross-sectional view of barrier means 32 disposed within manifold 30 of an engine compressor casing. Barrier means 32 is of generally arcuate construction (as best viewed in FIG. 2) following the general curvature of the gas turbine engine 20 and bleed manifold 30 and may be comprised of a plurality of circumferentially extending segments to accommodate easier installation. As seen in FIG. 3, barrier means 32 is comprised of a generally rectangular cross section and includes axially and circumferentially extending base portion 42 provided with a plurality of fluid entrance apertures 46, only one of which is shown in cross section. Radially and circumferentially extending fluid exit wall portion 44, penetrated by a plurality of circumferentially spaced fluid exit apertures 48, projects radially from one side of base portion 42. Fluid entrance apertures 46 and fluid exit apertures 48 are disposed in barrier means 32 in a nonaligned fashion; that is, in a fashion such that fluid exiting through apertures 48 is not flowing in the same direction and along the same line as fluid flowing through entrance apertures 46. Hence, the fluid stream flowing through both pluralities of apertures 46, 48 must change flow direction between the entrance apertures 46 and the exit apertures 48.

Barrier means 32 further includes double-walled portion 50, connecting frontal wall 44 and base portion 42, which circumscribes and encloses fluid passage chamber 52. Double-walled portion 50 is of a generally curved cross-sectional configuration so as to form open-ended stagnation pocket 54 bounded (as viewed in FIG. 3) by the curvature of double-walled portion 50 and opening into chamber 52. Stagnation pocket 54 is generally disposed radially outward of the fluid stream flowing through chamber 52. Under engine operating conditions, a portion of the high velocity air stream initially entering chamber 52 will be directed into stagnation pocket 54. Pressurized air initially filling pocket 54 is substantially prevented from re-entering chamber 52 by subsequent air flowing through inlet 46. Hence, subsequent pressurized air entering chamber 52 through inlet apertures 45 flows directly to and out of exit apertures 48 without entering stagnation pocket 54 which provides a pocket of relatively stationary air immediately adjacent the high velocity air stream flowing through chamber 52.

Doubled-walled portion 50 is comprised of a pair of spaced apart outer and inner walls 56, 58 respectively which are generally parallel to each other and form a space 60 therebetween. As viewed in FIG. 3, space 60 is closed from communication with chamber 52 by closure means 62 which may be provided by simply joining the inner wall 58 with the outer wall 56. Space 60 is filled with a material having heat-resistant characteristics such as high melting or sublimation point and low heat transfer coefficient. It has been found that carbon or graphite materials are particularly suitable as a filler for space 60.

Barrier means 32 are depicted in FIG. 3 in cross section assembled within manifold 30 which circumferentially surrounds gas turbine engine compressor casing 63. Barrier means 32 may be secured to casing 63 by a plurality of fasteners, such as rivets 64, only one of which is shown, such that the plurality of inlet apertures 46 in base portion 42 of barrier means 32 overlap the plurality of complementary circumferentially spaced bleed ports 31 in casing 62. A shielding grommet 66 resides in bleed ports 31 in casing 62 for the purpose of protecting the surface defining bleed ports 31 from impingement by burning titanium particles as well as providing additional means for attaching barrier means 32 to casing 62. Shielding grommet 66 is comprised of a metallic alloy material which is essentially non-pyrophoric in the engine environment. Alloys rich in nickel and/or molybdenum content have been found to be particularly suitable for this application.

The present invention protects manifold wall 33 from impingement with burning or molten titanium particles in a manner now to be described. Pressurized air flowing in compressor section 24, is drawn radially through compressor bleed ports 31 in a fluid stream which would, but for the interposition of barrier means 32, impinge directly upon and damage manifold wall 33. Interposition of barrier means 32 within the fluid stream permits the titanium particles to substantially burn before contacting the manifold wall 33. More specifically, with barrier means 32 disposed in the air stream between the inlet 46 and the manifold walls 33, the high velocity fluid air stream is abruptly redirected in chamber 52 from the radial to the axial direction due to the non-alignment of inlet apertures 46 and outlet apertures 48. As will now be explained the abrupt change in direction causes the titanium particles to enter stagnation pocket 54 where the particles are substantially consumed.

Titanium particles entering chamber 52 through inlet 46 may be comprised of an array of particles of different size and weight. The momentum of the heavier particles is sufficiently high, due to the high velocity at which the particles are traveling in the air stream, to prevent the particles from following the abrupt change in direction, from radial to axial, of the air stream flowing in chamber 52. Hence, the heavier particles continue to travel in the radial direction, leave the high velocity air stream and enter stagnation pocket 54 where they remain until substantially burned. The high velocity air stream exits chamber 52 through exit aperture 48, without the heavier titanium particles, and flows circumferentially through manifold 30. The air stream exiting through aperture 48 may contain a few, smaller titanium particles but these are quickly burned sufficiently such that they do not have sufficient heat energy to ignite the manifold wall 33.

Some of the larger particles leaving the flow stream and entering stagnation pocket 54 may adhere to the inner wall 58 and continue to burn for a short time until completely consumed. Other particles, striking the inner wall 58, splatter into additional particles of smaller size and likewise will continue to burn within stagnation pocket 54. Since the particle division caused by collision with inner wall 58 results in additional particles having a larger surface area to mass ratio than the undivided particle, burning of the particles within stagnation pocket 54 is accomplished within a shorter period of time than if barrier means 32 were not employed.

Since titanium particles burning within pocket 54 generate intense heat, double-walled portion 50 of barrier means 32 must be well adapted to withstand high temperatures during the burn life of the particles and hence provide containment of the burning particles within pocket 54. The present invention permits such containment by providing the aforementioned double-walled construction comprised of inner and outer walls 58, 50, respectively. The carbon-like low heat transfer coefficient material with sublimation temperature above the Ti combustion temperature, disposed within space 60 of double-walled portion 50, serves to insulate outer wall 56 from the intensive heat generated within pocket 54. Additionally, while inner wall 58, to which the burning titanium may be adhered, may itself melt and burn or rupture, wall 58 serves to provide initial protection for the material within space 60. By the time wall 58 is penetrated, the particles have been substantially consumed and do not have sufficient energy available to further penetrate the carbon-like material in space 60. By providing wall 58 and carbon-like materials of appropriate thickness the structural integrity of outer wall 56 may be assured for the duration of the relatively brief titanium fire. Hence, the present invention is well adapted to confine the burning particles within barrier means 32.

Figure 4:
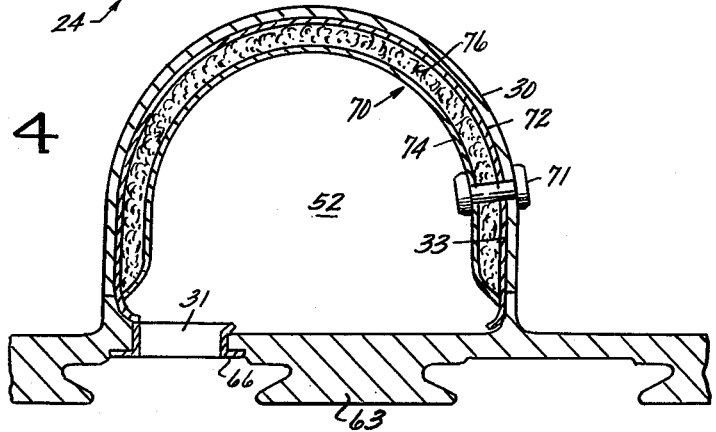
FIG. 4 is a cross-sectional view of alternative barrier means disposed within the engine bleed manifold.

Referring now to FIG. 4, an alternate embodiment of the present invention is depicted secured by fasteners 71 within manifold 30. More specifically, barrier means 70, comprised of outer and inner walls 72 and 74, respectively, is disposed within manifold 30 between compressor casing bleed apertures 31 and inner manifold wall 33. Barrier means 70 is shown to have the same general contour as manifold 30 and to be disposed adjacent to and in abutting engagement therewith. Additionally, barrier means 70 extends circumferentially within manifold 30 about the axial centerline of the gas turbine engine and, as with the embodiment previously described may be comprised of a plurality of circumferentially extending segments to accommodate easier installation. Inner and outer walls 74 and 72 are spaced apart to form a space 76 filled with the aforedescribed low heat transfer coefficient material. Outer wall 72 is disposed between inner wall 74 and manifold wall 33. Barrier means 70 forms a protective liner within manifold 30 which causes burning or molten titanium particles to impinge upon inner wall 74 of barrier means 70 rather than the inner wall 33 of manifold 30. The carbon-like material within space 76 insulates and protects both outer wall 72 and manifold wall 33 from the heat generated by the burning particles in the same manner as in the embodiment previously described.

From the foregoing it is now apparent that manifold protection means have been provided which are well adapted to fulfill the aforestated objects of the invention and that while a number of embodiments of the invention have been described for purposes of illustration, it is understood that other equivalent forms of the invention are possible within the scope of the appended claims.

Having thus described the invention, what is claimed as new and useful and desired to be secured by U.S. Letters Patent is:

1. A protection system for use in a bleed manifold associated with a gas turbine engine, said manifold including a wall partially defining a flow path for a fluid flowing in a stream through said manifold, a fluid inlet disposed upstream of said wall, said fluid flow stream periodically including incendiary particles entrained therein, said protection system comprising barrier means disposed within said manifold and within said flow stream upstream of said wall for preventing impingement of at least a portion of said particles upon said wall, said barrier means comprising fluid flow stream turning means for removing said portion of said particles from said fluid flow stream and pocket means disposed adjacent said fluid flow stream for receiving said particles removed from said flow stream by said stream turning means.

2. The invention as set forth in claim 1 wherein said stream turning means comprises fluid inlet and outlet means disposed in said barrier means for providing an abrupt change in direction of the fluid flow stream flowing within said barrier means whereby the inertia of said portion of particles carries said portion of particles out of said flow stream and into said pocket means.

3. The invention as set forth in claim 2 wherein said pocket means are formed by a double-walled portion having spaced apart inner and outer walls, said inner walls disposed so as to be impinged upon by said portion of particles removed from said flow stream.

4. The invention as set forth in claim 3 wherein said barrier means further includes a material having a low heat transfer coefficient and high sublimation temperature disposed between said inner and outer barrier walls.

5. A protection system for use in a bleed manifold associated with a gas turbine engine, said manifold including a wall partially defining a flow path for a fluid flowing in a stream through said manifold, a fluid inlet disposed upstream of said wall, said fluid flow stream periodically including incendiary particles entrained therein, said protection system comprising barrier means disposed within said manifold and within said flow stream upstream of said wall for preventing impingement of at least a portion of said particles upon said wall, wherein said barrier means is comprised of a circumferentially and axially extending base portion having a plurality of fluid inlet apertures disposed therein, said base portion disposed in abutting engagement with a casing portion of said engine such that said inlet apertures overlap bleed ports in said casing, a radially and circumferentially extending fluid exit wall depending radially from said base portion and having a plurality of fluid exit apertures disposed therein, a double-walled portion having spaced apart inner and outer walls, said double-walled portion having a generally curved configuration and connecting said base portion and said exit wall portion.

6. A protection system for use in a bleed manifold associated with a gas turbine engine, said manifold including a wall partially defining a flow path for a fluid flowing in a stream through said manifold, a fluid inlet disposed upstream of said wall, said fluid flow stream periodically including incendiary particles entrained therein, said protection system comprising barrier means disposed within said manifold and within said flow stream upstream of said wall for preventing impingement of at least a portion of said particles upon said wall, said barrier means comprising protective liner means disposed between said manifold wall and said stream of fluid flowing within said manifold for receiving impingement by said particles, wherein said protective liner means includes inner and outer spaced apart walls, said outer wall being disposed between said inner wall and said manifold wall, and a material having a low heat transfer coefficient and a high sublimation temperature disposed in said space between said inner and outer walls.

7. The invention as set forth in claim 6 wherein said barrier means has the same general contour of said manifold wall.

8. The invention as set forth in claim 7 wherein said barrier means abuttingly engages said manifold wall.

9. The invention as set forth in claim 8 wherein said barrier means extends circumferentially about the axial centerline of said engine and is comprised of a plurality of circumferentially extending segments.

* * * * *